United States Patent
Ludwig et al.

(10) Patent No.: US 7,122,215 B2
(45) Date of Patent: Oct. 17, 2006

(54) COMPOSITE PARTICLES IMPARTING SEQUENTIAL CHANGES IN FOOD PRODUCTS AND METHODS OF MAKING SAME

(75) Inventors: Cathy Jean Ludwig, Grayslake, IL (US); Anilkumar Ganapati Gaonkar, Buffalo Grove, IL (US); Charles R. Frey, Waunakee, WI (US)

(73) Assignee: Kraft Foods Holdings, Inc., NorthField, IL (US)

( * ) Notice: Subject to any disclaimer, the term of this patent is extended or adjusted under 35 U.S.C. 154(b) by 307 days.

(21) Appl. No.: 10/726,150

(22) Filed: Dec. 2, 2003

(65) Prior Publication Data
US 2005/0118306 A1   Jun. 2, 2005

(51) Int. Cl.
*A23L 1/27* (2006.01)
*A23L 2/00* (2006.01)

(52) U.S. Cl. ............... 426/103; 426/104; 426/250; 426/262; 426/302; 426/330.3; 426/534; 426/590; 426/650

(58) Field of Classification Search ......... 426/590, 426/104, 103, 250, 262, 302, 330.3, 534, 426/650
See application file for complete search history.

(56) References Cited

U.S. PATENT DOCUMENTS

| | | | |
|---|---|---|---|
| 4,187,326 A | 2/1980 | Serafino et al. | |
| 4,201,794 A | 5/1980 | Sumitani | |
| 4,230,687 A * | 10/1980 | Sair et al. ............... | 424/485 |
| 4,760,138 A | 7/1988 | So et al. | |
| 4,853,235 A | 8/1989 | Tomomatsu | |
| 4,981,698 A * | 1/1991 | Cherukuri et al. ........ | 426/5 |
| 5,154,917 A | 10/1992 | Ibrahim et al. | |
| 5,223,245 A | 6/1993 | Ibrahim et al. | |
| 5,562,939 A | 10/1996 | Lewis | |
| 5,958,481 A | 9/1999 | Hodges | |
| 6,106,883 A | 8/2000 | Sokolik et al. | |
| 6,120,821 A | 9/2000 | Goodin et al. | |
| 6,231,901 B1 | 5/2001 | Sharkasi et al. | |
| 6,319,535 B1 | 11/2001 | Shaw | |
| 6,365,209 B1 | 4/2002 | Cherukuri | |
| 6,500,473 B1 | 12/2002 | Koehler et al. | |
| 6,607,744 B1 | 8/2003 | Ribi | |
| 2001/0048965 A1 * | 12/2001 | Cherukuri ............... | 426/660 |

FOREIGN PATENT DOCUMENTS

EP   1159882 A   12/2001

(Continued)

OTHER PUBLICATIONS

JP 55015770-Abstract.

(Continued)

*Primary Examiner*—Helen Pratt
(74) *Attorney, Agent, or Firm*—Fitch, Even, Tabin & Flannery (57) ABSTRACT

Composite particles are provided that impart unique, entertaining optical and/or organoleptic effects in food products when exposed to an aqueous environment. In one embodiment, the composite particles have a least two layers which, when exposed to an aqueous environment, provide at least two sequential changes in the food product. Such changes can include changes in color or other visual appearance characteristics, flavor, and the like, as well as combinations thereof. In another embodiment, the composite particles are included in a powdered beverage mix wherein the powdered beverage mix itself provide the initial sequential change followed, by an appropriate delay, the second sequential change; further sequential changes can be provided, if desired, by providing additional layers with the appropriate optical and/or organoleptic ingredients therein.

23 Claims, 1 Drawing Sheet

FOREIGN PATENT DOCUMENTS

EP    1252828 A    10/2002
WO    WO 02/00920    1/2002

OTHER PUBLICATIONS

JP 59227276-Abstract.
JP 63148963-Abstract.
JP 2207778-Abstract.
JP 3195462-Abstract.
JP 10248491-Abstract.
JP 10276694-Abstract.
JP 2000083593-Abstract.
JP 2000106829-Abstract.
JP 2001061426-Abstract.

* cited by examiner

COMPOSITE PARTICLES IMPARTING SEQUENTIAL CHANGES IN FOOD PRODUCTS AND METHODS OF MAKING SAME

FIELD OF THE INVENTION

The present invention generally relates to particulate materials that impart sequential changes in food products when exposed to an aqueous environment. In a preferred embodiment, the present invention relates to powdered beverage mixtures containing particulate materials that impart sequential changes when exposed to an aqueous environment.

BACKGROUND OF THE INVENTION

Powdered beverage mixes, such as KOOL-AID® and TANG®, have been commercially available for many years. They are relatively long shelf life, stable products that are reconstituted from the dry mixes when desired without the need to handle and transport the bulk fluid carrier. Powdered beverage products generally are an alternative product choice for consumers with so-called ready-to-drink (RTD) beverage products. RTD beverages offer a consumer a different form of convenience because the consumer does not need to formulate the drink from powder and water before consuming it. Beyond these differences, the conventional reconstituted powdered beverages and RTD beverages are often very similar to consumers. The food and beverage industry would be interested in novelties that can be introduced in powdered beverage mixes to help differentiate these product lines and spark consumer interest in powdered beverage mixes.

U.S. Pat. No. 4,201,794 describes a powdered composition containing an anthraquinonoid compound, one or more organic acids, and one or more alkaline salts, wherein the organic acids or alkaline salts are coated with water soluble substance so that the pH of the solution in which the powdered composition is placed can be changed, thereby varying the color of the anthraquinonoid in solution.

U.S. Pat. No. 4,853,235 describes cereals and confections which change color on contact with an aqueous liquid (e.g., milk). The cereal or confection particles are coated with a water soluble liquid which allows an edible opaque powder (e.g., sugar, starch, titan white) to adhere to the particles and obscure the underlying color. When placed in an aqueous environment, the underlying color is exposed, thereby changing the color.

U.S. Pat. No. 5,958,481 provides a method for making novelty ice cubes that change color when melting.

U.S. Pat. No. 6,231,901 provides a frozen confectionery product which changes color as it melts. In one embodiment, the color change is effected by changes in the pH as the product melts. In another embodiment, colorants are contained in coating layers and are released by the consumer licking the confectionery.

U.S. Pat. No. 6,120,821 provides a food composition having the ability to change color when heated above 160° F.

PCT International Application PCT/US01/20260 provides ingestible compositions, including food products, beverages, and medicaments, which undergo a chromic change in response to a triggering event (e.g., storage temperature, cooking temperature, light exposure, pH change, hydration or solvation change, mechanic stress, and the like). Thus, the product changes color in response to environmental cues and can alert the consumer that such triggering events have, or are, occurring.

U.S. Pat. No. 6,319,535 describes an edible confection with a recognizable shape that repeatedly rises and sinks in a transparent carbonated beverage due to its changing buoyancy resulting from physical attachment of carbonation bubbles derived from the beverage onto the surface of the confection until it becomes buoyant enough to cause it to rise to the surface of the beverage where the attached bubbles escape to the atmosphere causing the confection to become less buoyant such that it descends back towards the bottom of the drink; the attachment of carbonation bubbles begins again, and the confection's motion cycle repeats itself.

U.S. Pat. No. 4,760,138 describes dry carbonating agents comprised of a carbohydrate/metal bicarbonate complex prepared by reacting a carbohydrate in aqueous solution with metal hydroxide or oxide at a temperature not exceeding 25° C. to form a carbohydrate/metal hydroxide adduct to which carbon dioxide is then introduced to form the complex, which is dried for use in beverage powders. Upon rehydration, the complex releases carbon dioxide and carbonates the beverage. The carbohydrates are described as mono-, di-, and polysaccharides and polyols.

U.S. Pat. Nos. 6,106,883 and 5,562,939 describe inclusions suspended within a liquid, in which the inclusions are pieces of a jelly-like substance described as fruit pulp cells, fruit pulp particles, fruit pieces, gold particles, droplets of flavoring, or clouding agents. A pre-gel solution containing gellan gum is incorporated into a liquid composition with the inclusions. The resulting suspending solution is then agitated to suspend the inclusions such that they do not float or sink.

U.S. Pat. No. 4,187,326 describes a fruit flavored dry beverage mix which comprises sugar, food acid, flavor, color, and a clouding agent obtained by co-drying an aqueous dispersion comprising a major amount of solubilized maltodextrin and a minor amount of xanthan gum and titanium dioxide.

U.S. Pat. No. 6,365,209 describes an encapsulated product in the form of a caplet containing an active ingredient that can be incorporated into a food item, soft confectionary product, hard confectionary product, jelly gum confectionary product, dry beverage, or chewing gum product.

There remains a need for improved approaches for introducing components in food products that provide a more stimulating visual impact upon the consumer to increase the consumer's enjoyment of the beverage.

The present invention fulfills these, as well as other needs and objectives, as will be apparent from the following description of embodiments of the present invention.

SUMMARY OF THE INVENTION

This invention provides new composite particles that impart unique, entertaining optical and/or organoleptic effects in food products when exposed to an aqueous environment. In one embodiment, the composite particles have at least two layers which, when exposed to an aqueous environment, provide at least two sequential changes in the food product. Such changes can include changes in color or other visual appearance characteristics, flavor, and the like, as well as combinations thereof. Thus, for example, the composite particles of this invention might, when exposed to an aqueous environment, provide a first color/flavor combination followed by a second, and distinct, color/flavor combination. Such sequential changes in a food product, especially in a beverage, would provide an interactive, fun visual effect, especially for children.

Figure 2:
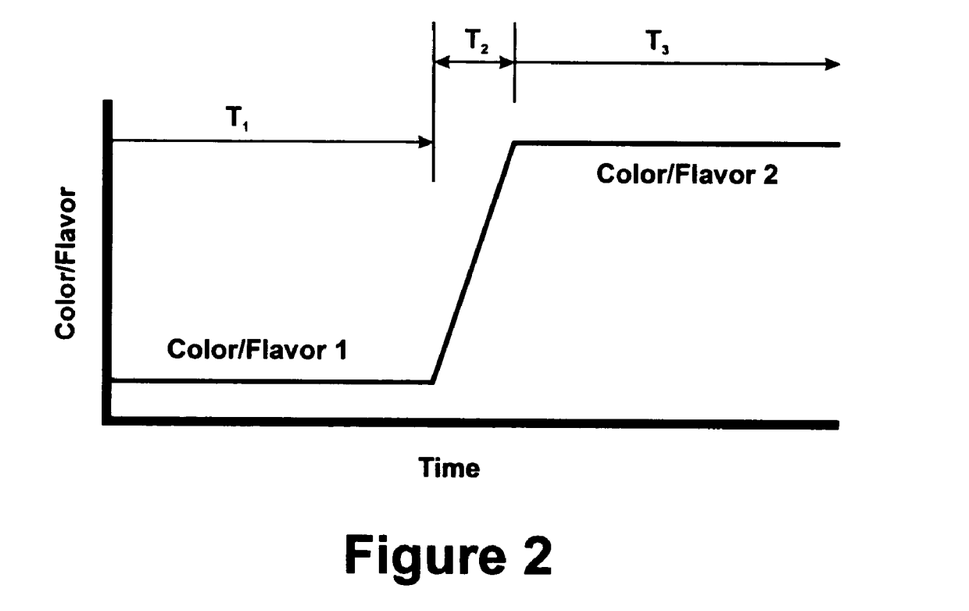
FIG. 2 provides a graph illustrating the sequential changes as a function of time for one embodiment of the composite particle illustrated in FIG. 1A.

In another embodiment, these composite particles are included a powdered beverage mix that can be reconstituted to form a beverage. When reconstituted, at least two sequential changes are provided within the beverage that increases the consumer's interest in and enjoyment of the beverage. In one aspect, sequential color and flavor changes in the beverage are provided. Thus, for example and as shown in FIG. 2, when the powder mix is first dissolved in water, the beverage provides a first color and a first flavor that predominate for a first time period (say $T_1$). After completion of $T_1$, the color and flavor begin to change (over a transitional or delay time $T_2$) to a second color and second flavor which predominate for a third time period $T_3$. Time period $T_3$ (wherein the second color and second flavor predominate) may continue indefinitely (i.e., until the beverage is consumed) or may transition into additional colors and/or flavors if desired. In one embodiment, a first time period $T_1$ of 0 to about 1 minute for the first color and/or first flavor (provided by an outer encapsulating coating on the composite particles or from the powdered beverage mix itself) is provided, a transitional or delay period $T_2$ of about 0.5 to about 30 minutes (preferably about 0.5 to about 3 minutes), and a second time period $T_3$ until the product is consumed for the second color and/or second flavor (provided by an inner encapsulating coating of the composite particle). If a third color and/or third flavor is desired, after the second time period $T_3$ of about 2 to about 5 minutes, and a second transitional period $T_4$ of about 2 to about 30 minutes, the third color and/or third flavor (provided by an encapsulating coating placed inner of the other encapsulating coatings) could predominate for a third time period $T_5$ until the beverage is consumed. Of course, the number, nature, and duration of each sequential change as well as the length of the transitional periods can be modified as desired to achieve the desired visual and/or organoleptic effect.

In one embodiment, a powdered beverage mix includes composite particles comprising a core particle having a first or inner encapsulating coating formed thereon which contains a first color, first flavor, and/or first other modifying agent, followed by a second or outer encapsulating coating which contains a second color, second flavor, and/or second other modifying agent. A third encapsulating coating could follow having a third color, third flavor, and/or third other modifying agent. An essentially inert coating, if desired, could be placed between adjacent encapsulating coatings in order to prolong the effect of the preceding encapsulating coating. If desired, the core could be inert (i.e., not contribute to the flavor or color) or it could essentially form the first or inner coating.

In another embodiment, a powdered beverage mix includes composite particles comprising a core particle having a first or inner encapsulating coating formed thereon which contains a first color, first flavor, and/or first other modifying agent, followed an inert second or outer encapsulating coating; the second color, second flavor, and/or second other modifying agent is provided by the powdered beverage mix itself rather than the composite particles. In this embodiment, the sequential changes are provided by the composite particles in combination with the powdered beverage mix; when dissolved in water, the effect of the second color, second flavor, and/or second other modifying agent from the powdered beverage mix will take place, followed, after a delay due to the inert layer, by the effect of the first color, first flavor, and/or first other modifying agent from the inner encapsulating coating layer. Of course, the composite particles could have one or more additional layers placed nearer the center which could provide additional changes in the optical or organoleptic properties of the beverage.

Generally the composite particles are spherical in nature; of course, other shaped particles can be used if desired. Thus, for example, the composite particles could be spherical, cylindrical, flakes, football shaped, star shaped, heart shaped, crescent moon shaped, and the like. If desired, the composite particles may also contain a coating, preferably the outermost coating, containing a gas-forming substance as described in pending U.S. patent application Ser. No. 10/702,804, filed on Nov. 6, 2003, which is hereby incorporated by reference. Such a coating comprises a material that forms a propellant gas when contacted with an edible acid in an aqueous solution. The release of the gas propels the composite particles, causing them to independently move about in the solution. The resulting movement of the self-propelled composite particles in the solution creates an interesting optical effect. With such an optional layer, the composite particles can move in the solution as the color or flavor develops and/or changes, creating an interesting optical effect.

The composite particles comprise cores and/or coating layers that are edible, water-soluble materials (e.g., carbohydrates, gels, proteins, lipids, and the like). For purposes of this invention, the term water-soluble in reference to the particle core and/or coating layers is intended to include both water-soluble and water dispersible. The materials used in the core and/or coating layers are water-soluble or water dispersible to extent that they do not create a gritty mouthfeel in the beverage or significantly effect the clarity of the beverage. The encapsulating coating formed or deposited on the core comprises edible flavoring and/or coloring agents that are temporarily retained in place in the coating by an edible slow-dissolving matrix material and then released as the encapsulating coating is dissolved by the aqueous environment of the food or beverage product.

The coating is formed or deposited on the exterior surfaces of the core particles of the composite particles in a manner in which it encapsulates the surface of the core particles. As noted above, the core may be as a carrier or it may also contain flavor/color components. "Encapsulation" or equivalent language means the coating formed on the core particle covers essentially all of the outer surface of a particle. The extent of encapsulation by the coating must be sufficient such that the core particles are not overly exposed immediately to the solution and such that the desired transitions from one flavor or color to the next flavor or color occur over the desired time periods.

In one embodiment, the interesting visual and organoleptic effects imparted by the composite particles can be used to increase young consumers' interest in consuming a food or beverage fortified with vitamins, minerals, and/or other nutritional sources and supplements. In another embodiment, a method of making the composite particles is provided.

BRIEF DESCRIPTION OF THE DRAWINGS

Other features and advantages of the present invention will become apparent from the following detail description of preferred embodiments of the invention with reference to the drawings, in which.

DETAILED DESCRIPTION OF THE INVENTION

The present invention generally relates to the manufacture and use of edible composite particles which, when placed in an aqueous environment (e.g., a water-containing food product or beverage) will undergo sequential changes in one or more visual or organoleptic properties, thereby creating interesting and entertaining visual and/or organoleptic effects. The composite particles, for example, can be added as a discrete individual component to potable liquids, or as one of a plurality of components in combination as a powdered beverage mix that can be reconstituted with a fluid to prepare a drinkable beverage.

The composite particles should provide the following characteristics: (a) a water-soluble particle core and (b) at least one coating applied to the water-soluble particle core, wherein at least two sequential changes in optical or organoleptic properties occur when the composite particles are exposed to an aqueous environment. The coating dissolves slowly, not instantaneously, in water so that the optical or organoleptic effect persists for longer time. The composite particles, thus, include two primary structural components: an edible core and at least one edible coating that encapsulates the edible core. When placed in an aqueous environment, the composite particles dissolve slowly to, at a minimum, release a first optical or organoleptic effect which is then replaced over time to a second optical or organoleptic effect. The core and the coating comprises constituents that are edible, or which react in solution with other co-ingredients of the food or beverage to form edible substances and are soluble in water (i.e., no gritty texture remains after dissolution).

Figure 1:
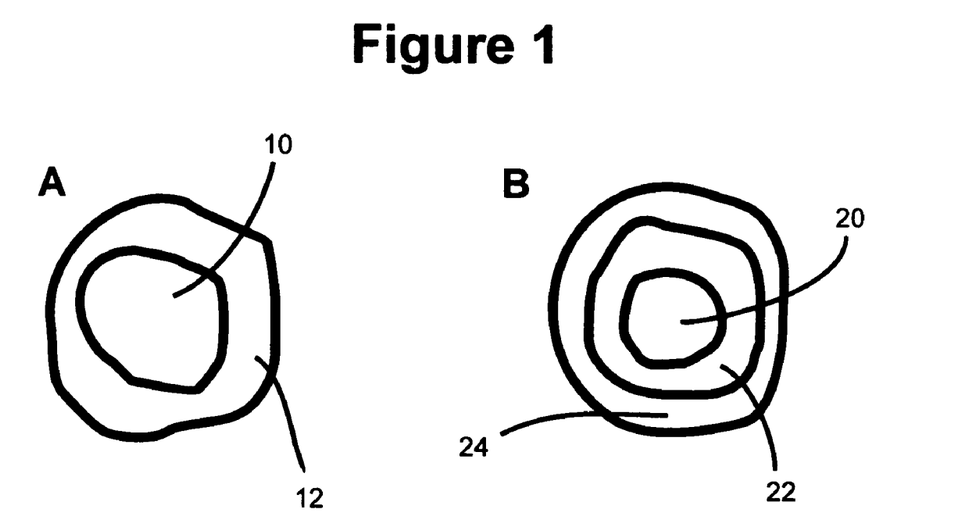
FIG. 1 illustrates a composite particle providing sequential changes when exposed to an aqueous environment. Part A illustrates a composite particle providing two sequential changes; and Part B illustrates a composite particle having a core and two coating layers which may provide differing sequential changes depending on the compositions of the core and the coating layers.

Non-limiting examples of composite particles are illustrated in FIG. 1. In FIG. 1A the composite particle consists of an edible core 10 and a first coating 12. In this example, both the core 10 and the first coating 12 would containing ingredients which, when dissolved in an aqueous environment, would produce sequential optical and/or organoleptic effects. Thus, for example, coating 12 could contain a color/flavor combination 1 and core 10 could contain a color/flavor combination 2. The time release characteristics of such a composite particle are shown graphically in FIG. 2. When placed in an aqueous environment (e.g., an aqueous beverage), coating 12 begins to dissolve, thereby releasing color/flavor combination 1. The beverage takes on the color and flavor provided by color/flavor combination 1. This color/flavor combination 1 persists for a time $T_1$ at which time the coating 12 has been completely dissolved and the core 10 begins to dissolve. As the core 10 begins to dissolve, the optical and flavor characteristics of the beverage begin to change due to release of the color/flavor combination 2. During this transition time $T_2$, the color and flavor will move from its initial state to its final state. After the transition time $T_2$, the color and flavor of the beverage will enter into its final state and preferably remain in that state for a time period $T_3$ (i.e., indefinitely or until consumed). Of course, the final optical and organoleptic state will depend on the blending of the color/flavor combination 1 and 2, their relative and absolute amounts in their respective portions of the composite particles, and the thickness of their respective portions.

FIG. 1B illustrates a composite particle having a core 20, an intermediate coating 22, and an outer coating 24. Such a composite particle could have a number of effects depending on how the optical and/or organoleptic ingredients are distributed through the various portions of the composite particle. In one embodiment, the core 20 could merely act as a carrier (i.e., containing no optical and/or organoleptic ingredients), with, for example, intermediate coating 22 containing color/flavor combination 1 and outer coating 24 containing color/flavor combination 2 to provide two sequential effects (i.e., color/flavor combination 2 followed by color/flavor combination 1). Alternatively, core 20 could contain color/flavor combination 2 and the outer coating 24 could contain color/flavor combination 1, with the intermediate coating 22 containing no optical and/or organoleptic ingredients; in such a composite particle, the intermediate coating 22 would essentially prolong the effect of the color/flavor combination 1 and delay the beginning of the effect of the color/flavor combination 2. Alternatively, core 20 could contain color/flavor combination 2 and the intermediate coating 22 could contain color/flavor combination 1, with the outer coating 24 containing no optical and/or organoleptic ingredients; in such a composite particle, the outer coating 24 would essentially delay the beginning of the sequential effects provided by the color/flavor combinations 1 and 2. In still another alternative, each of the core 20 and coatings 22 and 24 could contain color/flavor combinations, thereby providing sequential effects from the color/flavor combination contained in outer coating 24, followed by the effect from the color/flavor combination contained in intermediate coating 22, and finally from the color/flavor combination contained in the core 20.

In still another embodiment, the composite particle of FIG. 1B could be used in combination with a powdered beverage mixture which provides the initial optical and/or organoleptic properties; the composite particle would then provide the latter developing optical and/or organoleptic properties. In one embodiment, the core 20 could either be an inert carrier for the optical and/or organoleptic modifying ingredients in inner layer 22; in such a case, the outer layer 24 would preferably be an inert layer to delay the release of the optical and/or organoleptic ingredients from coating 22. Alternatively, the optical and/or organoleptic ingredients could be contained in the core 20 with both layers 22 and 24 being inert layers to delay the release of the optical and/or organoleptic ingredients from core 20. In such systems, the sequential optical and/or organoleptic properties would effectively be provided by the powdered beverage mix in combination with the composite particles.

In some instances, it may be desirable to delay the onset and/or extend the length of the optical and/or organoleptic effects. The optical and/or organoleptic effects (i.e., when they begin and how long they last) can be controlled by manipulating the composition and thickness of the coating and the concentration of the optical and/or organoleptic producing ingredients within the various layers. For example, the effects could be delayed by applying an inert coating (e.g., one not containing optical or organoleptic modifying ingredients) over the layer for which delay is desired. Only once the inert coating is dissolved, can the optical or organoleptic modifying ingredients be released into the aqueous environment to have their desired effect. The thickness of such an inert coating can be manipulated to control the length of the delay. Likewise, the duration of a given optical or organoleptic effect can be manipulated by controlling the thickness of the coating in which the optical or organoleptic modifying ingredients are contained. The intensity of the optical or organoleptic effect can also be modified by controlling the relative and absolute concentrations of the optical or organoleptic modifying ingredients in the core and/or coating layers as desired.

In a preferred embodiment, the optical and/or organoleptic modifying ingredients are encapsulated in a slow-dissolving matrix material in the core and/or one or more coatings. Upon and during gradual dissolution or melting of the matrix material, the optical and/or organoleptic modifying ingredients are released, thereby providing their desired effects. Since at least two distinct optical and/or organoleptic modifying ingredients are contained in separate core and/or coating layers within the composite particles (see FIG. 1), sequential optical or organoleptic effects are obtained (see FIG. 2) as the composite particles dissolve in the aqueous environment.

In one embodiment, the edible matrix material used to form the core and/or coating layers is a food polymer that slowly dissolves in water. The food polymer may be selected from gum arabic, gelatin, maltodextrin, xanthan gum, locust bean gum, guar, pectin, carrageenan, cellulose, and combinations thereof. Suitable cellulose materials include, for example, sodium carboxymethylcellulose, methylcellulose, hydroxypropylcellulose, and the like, as well as mixtures thereof. In one preferred embodiment, the food polymer is gum arabic, gelatin, a low DE maltodextrin, or combinations thereof. The matrix material for the core and/or coating layers may be the same throughout the particle or may be different for the core and each coating layer.

Although sugar is the preferred water-soluble core or coating material for the composite particles, other edible and water-soluble materials available in particulate form can be used. In one preferred embodiment, the core particles or coating layer may be commercially available confectionary sugar, such as large grain AA size sugar. More generally, the water-soluble core particles or coating layers are formed from a matrix material comprising a saccharide, such as a monosaccharide, a disaccharide, or a polysaccharide, and combinations thereof. The disaccharide may be selected from, for example, sucrose, maltose, cellobiose, lactose, and combinations thereof. The monosaccharide may be selected from, for example, fructose, glucose, dextrose, mannose, galactose, ribose, xylose, arabinose, gulose, lyxose, and combinations thereof. The polysaccharide may be selected from, for example, starch, dextrin, cellulose, polydextrose, raffinose, and combinations thereof.

The core and/or coating layers may also comprise edible salts or edible acid. Examples of edible salts include sodium chloride, potassium chloride, sodium phosphate, and sodium or potassium salts of organic acids (e.g., sodium or potassium citrate, sodium or potassium fumarate, sodium or potassium tartrate, and the like). Examples of edible acids, which should be dry, crystalline or granular in nature include citric acid, fumaric acid, tartaric acid, and the like.

The coating is formed or deposited on the exterior surfaces of the core particles of the composite particles in a manner in which it encapsulates the surface of the core particles. "Encapsulation" or equivalent language means the coating formed on the core particle covers essentially all of the outer surface of a particle. The extent of encapsulation by the coating must be sufficient such that the core particles or any intermediate coating layers are not overly exposed immediately to the solution such that the composite particles rapidly disintegrate due to premature dissolution of the cores or intermediate coating layers to achieve the desired sequential change in optical and/or organoleptic properties in the aqueous based food product or beverage. Preferably the coating layers (and inert layers if used) are of uniform thickness to provide better control of the desired sequential changes. Generally, "uniform thickness" is intended to mean that the thickness of the layer does not vary more than about 50 percent, and preferably no more than about 25 percent, in the composite particle.

In one embodiment, the core particles, which may or may not contain a first combination of optical and/or organoleptic modifying ingredients, are coated with a coating composition containing a second combination of optical and/or organoleptic modifying ingredients (which preferably are different from the first combination as well as those that may be present in other coating layers which may be applied) and matrix material by suspending the core particles in a fluid bed and spraying them with the coating composition containing the second combination of ingredients and matrix material, followed by drying, and recovering the coated particles. In these fluid bed coating systems, a top spray system can be used to apply the coating on the core particles. Alternatively, a bottom spray system, such as a Wurster spray system, can be used to apply the coating. Also, a tangential (rotor) spray system could be used to apply the coating to the core particles. Suitable multi-purpose fluid bed processors also are generally known for particle coating applications that enable different types of spray nozzle inserts to be readily installed in a common spray system, so that the same processor can be operated to apply a coating variously as a top spray, Wurster spray, or tangential spray. A coating system comprising a rotary drum coater also could be used. Of course, other coating or application systems, including coextrusion and film processing, could also be used. These coating processes can be run continuously or batch style. Suitable equipment for applying coatings on particles with these types of spray systems are commercially available. For example, suitable top-spray and bottom-spray fluid bed coaters available from Glatt Air Techniques Inc. can be used or readily adapted for use in applying the coating of the composite particles of embodiments of the present invention. If desired, additional coating layers may be applied which may, if desired, contain different combinations of optical and/or organoleptic modifying ingredients.

In preparing the core particles and coating compositions that is applied and then dried thereupon, the proportions of the optical and/or organoleptic modifying ingredients and matrix material are not particularly limited as long as sufficient amounts of each respective component are present in the dried coating to sustain their respective intended purpose. Namely, sufficient optical and/or organoleptic modifying ingredients should be included such that the desired optical and/or organoleptic effects are achieved with respect to the composite particles upon introduction into a potable liquid. The thickness of the core and coating layers should be sufficient to provide the desired duration, taking into account dissolution rates, for each optical and/or organoleptic change. In one embodiment, the core particles are prepared from a composition containing, on a dry basis, about 0.1 to about 10 percent of the optical and/or organoleptic modifying ingredients in the matrix material and coating composition is prepared as a sprayable aqueous solution containing, on a dry basis, about 0.5 to about 20 percent of the optical and/or organoleptic modifying ingredients in the matrix material. The matrix material used to prepare the core and the various coating layers in the composite may be the same or different matrix material. As discussed above, the core and/or coating layers may be formed of inert material (i.e., matrix material with no added optical and/or organoleptic modifying ingredients) so longs as sufficient coating layers containing such optical and/or organoleptic modifying ingredients are included to provide the desired sequential optical and/or organoleptic effects.

In addition, other materials (fillers) such as starch, maltodextrins, other carbohydrates, gums, and emulsifiers may be used in the core or coating compositions. The core and/or one or more of the coating layers also can be formulated to produce a distinctive sound, such as a fizzing, crackling, or similar sound, and/or movement of the particles. Thus, for example, the composite particles may also contain a coating, preferably the outermost coating, containing a gas-forming substance as described in pending U.S. patent application Ser. No. 10/702,804, filed on Nov. 6, 2003, which is hereby incorporated by reference. Such a coating comprises a material that forms a propellant gas when contacted with an edible acid in an aqueous solution. The release of the gas propels the composite particles, causing them to independently move about in the solution. The resulting movement of the self-propelled composite particles in the solution creates an interesting optical effect. With such an optional layer, the composite particles can move in the solution as the color or flavor develops and/or changes, creating an interesting optical effect.

Compositional ranges for the composite particles according to one non-limiting embodiment of the invention include, on a dry weight basis, about 10 to about 90 percent sugar or other water-soluble or water-dispersible core particles, about 1 to about 60 percent gum arabic, gelatin, or other slow dissolving food polymers, about 1 to about 50 percent optical and/or organoleptic modifying ingredients (e.g., colorants, flavorants, and the like), and 0 to about 50 percent additives such as starch, maltodextrins, other carbohydrates, and/or the like.

The composite particles generally have an overall size of about 0.1 to about 5 mm in diameter, and preferably about 0.5 to about 2 mm in diameter. Of course, larger or smaller size composite particles can be used if desired. Composite particle sizes are generally limited on the high side by practical considerations of maintaining a size such that the desired sequential changes occur within a reasonable amount of time but not so long that the food or beverage can not be consumed without consumer receiving a gritty mouthfeel from residual undissolved composite particles. The coating thickness of the core particles, as well as the coatings applied on the core particles, should also take these considerations into account. Generally, the core particles are about 0.01 to 4 mm in diameter with thickness of the coating layers being about 0.01 to about 1.5 mm. An inert layer can be placed on the outside of the composite particle, especially where the powdered beverage mix provide the first sequential change in optical and/or organoleptic properties, to provide a delay before the later sequential changes occur. Although the thickness of the inert layer can be varied to provide the desired delay time, it will generally be in the range of about 0.01 to about 1.5 mm. Such inert layers are preferably applied in multiple layers to better control the thickness.

In a further embodiment, a powdered beverage mix includes composite particles described herein. In one embodiment, the interesting sequential optical and/or organoleptic effects imparted by the composite particles can be used to increase young consumers' interest in drinking a beverage including vitamins, minerals, and/or other nutritional sources and supplements.

The powdered beverage mixes optionally can include other ingredients in addition to the composite particles. The only basic limitations on the optional ingredients is that they must be edible and not adversely effect the sequential changes brought about by the optical and/or organoleptic modifying ingredients. Of course, such optional ingredients should not impart an undesirable off-taste, off-color, off-odor, unpleasant mouthfeel, unpleasant smell, or gritty texture to the beverage. In an especially preferred embodiment, the powdered beverage mix contains composite particles which have, as their outer coating, an inert layer to slow the dissolution of the particles and, thus, to provide a delay in the release of the optical and/or organoleptic modifying ingredients therein; in this especially preferred embodiment, the initial optical and/or organoleptic are provided by powdered optical and/or organoleptic modifying ingredients in the powdered beverage mix itself. The initial optical and/or organoleptic effect is produced immediately when the powdered beverage mix is reconstituted with water, followed after a delay (the length of which will depend on the time required for the outer inert layer to dissolve) by the optical and/or organoleptic effect achieve from the inner layer of the composite particles containing the optical and/or organoleptic modifying agents.

The environment in which the composite particles, and any other ingredients, are dissolved can be aqueous-based, alcohol-based, or any other suitable liquid solvent for the ingredients. Water-based liquid vehicles are preferred in the practice of the invention. The proportion of liquid generally will be that sufficient to permit solubilization of the ingredients and also sufficient to permit the desired strength/dilution of the coloring and/or flavoring agents to be achieved. Generally, the proportion of water used in reconstituted beverages encompassed by the invention will be about 70 to about 99 percent.

The organoleptic modifying ingredients include, for example, flavors (both natural and artificial), aroma enhancing agents, flavor precursors, and the like. Preferably the organoleptic modifying ingredient is a food grade flavor. For beverages, especially preferred flavors include water-soluble, water-dispersible, or oil-soluble fruit flavoring agents. A fruit flavoring agent may be used, for example, which imparts a orange, grapefruit, peach, lime, lemon, grape, pineapple, kiwi, raspberry, cherry, or other fruit flavor. The optical modifying ingredients include, for example, colorants, glitter, color modifying agents, and the like. Preferred optical modifying ingredients include colorants, and especially U.S. Certified Food Colors. Of course, the optical and organoleptic modifying agents should be edible.

The present composite particles are especially useful for the preparation of beverages which undergo sequential changes when prepared. Especially preferred are dry beverage mixes which, when reconstituted with water, provide the desired sequential changes with regard to optical and/or organoleptic properties as a function of time (see FIG. 2). Indeed, the composite particles of this invention intended for use in dry beverage mixes can be modified since the dry beverage mix itself can provide the initial optical and/or organoleptic effect. Such a composite particle is preferably coated with one or more layers of inert ingredients to provide a delay in the development of the final optical and/or organoleptic effect. Thus, for example, a composite particle having only one layer providing an optical and/or organoleptic effect could be incorporated into a flavored and colored powdered dry mix. When reconstituted with water, the initial flavor/color would be provided by the powdered beverage mix itself, followed, after an appropriate delay, by the flavor/color combination provided by the composite particles.

Of course, the total composition of such dry beverage mix, including the composite particles, should be adjusted to provide the desired properties of the ultimate beverage. Thus, for example, if the particle core is a sugar, the amount of sugar added via the particles should be taken into account in formulation the remaining dry beverage composition to achieve the overall desired sweetness and/or other properties. The powdered beverage mixes of this invention can be reconstituted in a non-carbonated liquid, a carbonated liquid, or they optionally can be carbonated after reconstitution.

The beverage mixes of this invention also can contain a sweetener. The sweetener can be selected, for example, from one or more of sucrose, glucose, fructose, hydrolyzed corn starch, maltodextrin, corn syrup solids, lactose, high fructose corn syrup, fructo-oligosaccharides, artificial sweeteners, and mixtures thereof. The artificial sweeteners can be, for example, aspartame, sucralose, saccharine, cyclamates, and acesulfame; and they can be added to reduce caloric content. The sweetener generally will be present in granulated form in the mix prior to reconstituting the drink. The amount of sweetener can vary, but generally, if present, is in the range of from about 0.5 to about 25 percent of the reconstituted beverage or other type of beverage. Preservatives also can be added to the inventive beverage mixes, such as sodium benzoate, ascorbic acid, or propylene glycol.

Additional optional ingredients include one or more of other common ingredients for beverages (e.g., functional agents like flow agents (e.g., silica), caffeine, and the like). For health drinks, vitamins, minerals, and/or nutraceuticals also could be included.

In another embodiment, the composite particles described herein may be directly added in powder form to a liquid to impart the desired sequential optical and/or organoleptic effects. That is, in one embodiment, the composite particles may be added as a separate individual product to a ready-to-drink beverage (RTD) to impart the desired sequential optical and/or organoleptic effects.

In still another embodiment, the sequential effect could also be provided two or more different composite particles. For example, one composite particle might provide the initial color/flavor combination when first exposed to an aqueous environment. The second color/flavor combination could then be provided by a second composite particle; generally, the second composite particle would have an inert outer coating to provide the desired delay before the appearance of the second color/flavor combination.

The Examples that follow are intended to illustrate, and not to limit, the invention. All percentages used herein are by weight, unless otherwise indicated.

EXAMPLE 1

Citric acid particles (40+ mesh; 400 g) were coated with 400 g of an aqueous solution containing 40 percent maltodextrin (1 dextrose equivalent), 2 percent strawberry flavor, and 0.2 percent blue coloring in a Glatt agglomerator (nozzle setting of 0.5; flow rate of 18 ml/min; pressure of 4 bar; outlet air flap 20 percent open; inlet temperature of 50° C.; outlet temperature of 40° C.). The resulting particles were sieved through a 30 mesh screen. The thickness of the optical and organoleptic modifying ingredient layer was about 0.062 mm (62 microns). The resulting particles (390 g) were then coated with an inert layer using 585 g of an aqueous solution containing 40 percent gum arabic in the Glatt agglomerator (nozzle setting of 0.5; flow rate of 2 ml/min; pressure of 3 bar; outlet air flap 40 percent open; inlet temperature of 80° C.; outlet temperature of 80° C.). The thickness of the inert layer was about 0.132 mm (132 microns).

The coated particles (about 0.38 g) was mixed with a powdered lemonade mixture (7.5 g) containing 0.01 g yellow colorant. The resulting powdered mixture was then added to about 150 g water to form a beverage. Initially, the beverage had a yellow color and lemon flavor. After about 1 minute, the beverage turned green and the strawberry flavor was released to yield a lemon-strawberry flavor.

EXAMPLE 2

Composite particles were prepared exactly as in Example 1 except that sugar particles were used as the core material in place of citric acid. Similar results were obtained as in Example 1 when a mixture formed from a similar lemonade mixture (containing yellow color) and the composite particles were mixed with water.

EXAMPLE 3

Sugar particles (40+ mesh; 2000 g) were coated with 2000 g of an aqueous solution containing 40 percent maltodextrin (10 dextrose equivalent), 5 percent strawberry flavor, and 0.2 percent red coloring in a Glatt agglomerator (nozzle setting of 0.5; flow rate of 16 ml/min; pressure of 4 bar; outlet air flap 20 percent open; inlet temperature of 60° C.; outlet temperature of 38° C.). The resulting particles were sieved through 14, 20, and 40 mesh screens and the fraction between 20 and 40 mesh was collected (about 2239 g). The thickness of the optical and organoleptic modifying ingredient layer was about 0.065 mm (65 microns). The resulting particles (2000 g) were then coated with an inert layer using 585 g of an aqueous solution containing 40 percent gum arabic in the Glatt agglomerator (nozzle setting of 0.5; flow rate of 16 ml/min; pressure of 4 bar; outlet air flap 20 percent open; inlet temperature of 45° C.; outlet temperature of 38° C.). The resulting particles were again size separated with the fraction between 20 and 40 mesh collected. The collected particles (2000 g) were then coated a third time using 2000 g of the same aqueous solution containing 40 percent gum arabic in the Glatt agglomerator with the same conditions. The total thickness of the inert layers (i.e., the outer coating layers containing no optical or organoleptic modifying ingredients) was about 0.086 mm (86 microns).

The resulting composite particles, when mixed with a powdered lemonade mixture containing a colorant or with another flavored and colored beverage mixture, would provide, when mixed with water, a beverage which would exhibit sequential color and flavor changes.

EXAMPLE 4

Sugar particles (40+ mesh; 2000 g) were coated with 2000 g of an aqueous solution containing 40 percent maltodextrin (10 dextrose equivalent), 5 percent strawberry flavor, and 0.2 percent red coloring in a Glatt agglomerator (nozzle setting of 2; flow rate of 16 ml/min; pressure of 4 bar; outlet air flap 20 percent open; inlet temperature of 60° C.; outlet temperature of 38° C.). The thickness of the optical and organoleptic modifying ingredient layer was about 0.065 mm (65 microns). The resulting particles (530 g) were coated with 530 g of an aqueous solution containing 40 percent maltodextrin (10 dextrose equivalent) in the Glatt agglomerator (nozzle setting of 2; flow rate of 4 ml/min; pressure of 2 bar; outlet air flap 10 percent open; inlet temperature of 40° C.; outlet temperature of 40° C.). The resulting particles (565 g) were again coated with 565 g of the same maltodextrin solution under the same conditions. The total thickness of the inert layer was about 0.086 mm (86 microns).

The resulting composite particles, when mixed with a powdered lemonade mixture containing a colorant or with another flavored and colored beverage mixture, would provide, when mixed with water, a beverage which would exhibit sequential color and flavor changes.

EXAMPLE 5

Sugar particles (40+ mesh; 1000 g) were coated with 1000 g of an aqueous solution containing 40 percent maltodextrin (10 dextrose equivalent), 5 percent strawberry flavor, and 0.2 percent red coloring in a Glatt agglomerator (nozzle setting of 0.5; flow rate of 6 ml/min; pressure of 4 bar; outlet air flap 20 percent open; inlet temperature of 60° C.; outlet temperature of 38° C.). The thickness of the optical and organoleptic modifying ingredient layer was about 0.065 mm (65 microns). The resulting particles (1180 g) were coated with 1180 g of an aqueous solution containing 20 percent maltodextrin (10 dextrose equivalent) and 20 percent gum arabic in the Glatt agglomerator (nozzle setting of 2; flow rate of 5 ml/min; pressure of 3 bar; outlet air flap 10 percent open; inlet temperature of 40° C.; outlet temperature of 40° C.). The resulting particles (1000 g) were again coated with 1000 g of the same maltodextrin/gum arabic solution under the same conditions. The total thickness of the inert layer was about 0.086 mm (86 microns).

The resulting composite particles, when mixed with a powdered lemonade mixture containing a colorant or with another flavored and colored beverage mixture, would provide, when mixed with water, a beverage which would exhibit sequential color and flavor changes.

EXAMPLE 6

The composite particles of Examples 3, 4, and 5 were compared to determine the effect of the composition of the inert layer on the rate of release of the optical and organoleptic modifying ingredients. A model aqueous solution containing 6.2 percent sugar and 0.4 percent citric acid was prepared. The model aqueous solution (200 g) and 0.4 g of the composite particles were combined and stirred. Aliquots (1.6 ml) were removed every 10 seconds and the absorbance measured using a spectrophotometer. The inert coating using only maltodextrin (Example 4 composite particles) provided the quickest release (i.e., the shortest delay), followed by the inert coating containing both maltodextrin and gum arabic (Example 5 composite particles), followed by the inert coating containing only gum arabic (Example 3 composite particles) have the slowest release (i.e., the longest delay).

EXAMPLE 7

Any of the coated particles of Examples 1–5 could be further coated with a second color and flavor combination, followed, if desired, with an additional inert coating. Such composite particles could be used in an unflavored and/or uncolored beverage mixture wherein the sequential color/flavor changes would be provided solely by the composite particles. Such composite particles (preferably having the additional inert coating) could also be used in a flavored and/or colored beverage mixture (e.g., a powdered lemonade mixture containing a colorant) to provide three sequential color/flavor changes.

EXAMPLE 8

Sugar particles (40+ mesh; 400 g) were coated with 300 g of an aqueous solution containing 60 percent maltodextrin (25 dextrose equivalent) and 2.0 percent yellow coloring in a Glatt agglomerator using similar conditions as described in the above examples. The thickness of the optical modifying ingredient layer was about 0.068 mm (68 microns). A first flavor could have been added to aqueous solution as described in the examples above.

Separately, sugar particles (40+ mesh; 600 g) were coated with 600 g of an aqueous solution containing 58 percent maltodextrin (10 dextrose equivalent) and 0.6 percent blue coloring in a Glatt agglomerator using similar conditions as described in the above examples. The resulting particles (500 g) were coated as second time using a similar aqueous solution (60 percent maltodextrin (10 dextrose equivalent)) and the same agglomerating conditions. The total thickness of the optical modifying ingredient layer was about 0.148 mm (148 microns). A second flavor could have been added to aqueous solution as described in the examples above. The resulting particles (349 g) were coated with an aqueous solution (400 g) containing 15 percent type A gelatin (100 bloom) to form an inert layer with a thickness of about 0.041 mm (41 microns). The inert layer delays dissolution of the blue containing particles when exposed to an aqueous environment.

Both the yellow-containing and the blue-containing particles were attached to a Honeycomb® cereal by first sprinkling polydextrose on to the cereal pieces, then sprinkling the yellow-containing and blue-containing particles (1 to 1 ratio), followed by drying at about 300° F. for about 2 minutes. At the elevated temperatures, the polydextrose melted; when cooled, the polydextrose recrystalized, thus adhering the yellow-containing and blue-containing particles to the cereal pieces. When combined with milk, the cereal immediately turned the milk to a yellow color, followed by a change to a green color after about 2 to 3 minutes.

EXAMPLE 9

Sugar particles (40+ mesh; 400 g) were treated with 300 g of an aqueous solution containing 60 percent maltodextrin (25 dextrose equivalent) and 2.0 percent yellow coloring in a Glatt agglomerator using similar conditions as described in the above examples. In effect, the particle core was colored yellow. The yellow colored sugar particles and the blue-containing particles of Example 8 were attached to a Honeycomb® cereal in the same manner as in Example 8. When contacted with milk, the resulting cereal turned the milk yellow immediately followed by a change to a green color after about 2 to 3 minutes.

By increasing the blue color concentration in the blue-containing particles, the color change can go from the initial yellow color, followed by the green color, followed finally by a blue color as the blue color released overwhelms the initial yellow. The increased blue color concentration in the blue-containing particles could result by simply increasing the blue concentration in the aqueous solution used to coat the particles or by providing additional layers of the blue-containing coating.

The general methods used to provide color-changing cereal products in Examples 8 and 9 could be used to prepare other solid food products wherein the composite particles provide sequential color and/or flavor changes. Non-limiting examples of such food products include, macaroni and cheese, instant puddings, dry soup mixes, and the like.

EXAMPLE 10

This example illustrates the use of other coating or matrix materials. Sugar particles (sieved between 50 and 200 mesh size) were coated in a Coating Place agglomerator using an aqueous solution containing 40.7 percent strawberry flavor, 21.2 percent maltodextrin (4 dextrose equivalent), 1.6 percent blue coloring, and 1.2 percent gum arabic. Coated particles having sizes between 25 and 35 mesh were collected. The coating thickness was about 0.017 mm (17 microns).

A first portion of the above coated particles (300 g) was coated with an inert layer using 480 g of an aqueous solution containing about 36 percent shellac (Marcoat 125 from Emerson Resources, Inc. (Norristown, Pa.); a 25 percent aqueous based shellac solution) and about 6 percent hydroxylpropylmethylcellulose. The thickness of the inert layer in the resulting composite particles No. 1 was about 0.016 mm (16 microns).

A second portion of the above coated particles (600 g) was coated with an inert layer using 300 g of melted stearic acid. The thickness of the inert layer in the resulting composite particles No. 2 was about 0.036 mm (36 microns).

About 0.55 g of either composite particles No. 1 or No. 2 were mixed with about 13 g of a lemonade mixture containing about 0.012 g of yellow color granules. Beverages were prepared by adding about 150 ml water. Both beverages were initially a yellow color which, over time, turned green. For the beverage prepared with composite particles No. 1, the green color appeared after about 3 minutes; for the beverage prepared with composite particles No. 3, the green color appeared after about 10 minutes. The difference in the delay time for the appearance of the green color was due to the different rates of solubility of the two inert layers.

While the invention has been particularly described with specific reference to particular process and product embodiments, it will be appreciated that various alterations, modifications and adaptions may be based on the present disclosure, and are intended to be within the spirit and scope of the present invention as defined by the following claims.

What is claimed is:

1. Composite particles that provide a sequential change in optical and organoleptic properties in a food product when exposed to an aqueous environment, wherein the sequential change comprises at least (1) a first change in the optical and organoleptic properties and (2) a second change in the optical and organoleptic properties, said composite particles comprise a core particle having a first encapsulating coating formed thereon which contains a first optical modifying agent and a first organoleptic modifying agent, followed by a second encapsulating coating surrounding the first encapsulating coating, the second encapsulating coating containing a second optical modifying agent and a second organoleptic modifying agent; wherein, when the composite particles are exposed to water, the second optical modifying agent and the second organoleptic modifying agent are first released from the second encapsulating coating by dissolution of the second encapsulating coating in the aqueous environment to provide the first change in the optical and organoleptic properties, and wherein the first optical modifying agent and the first organoleptic modifying agent are thereafter released from the first encapsulating coating by dissolution of the first encapsulating coating in the aqueous environment to provide the second change in the optical and organoleptic properties; and wherein the composite particles are soluble in water.

2. The composite particles of claim 1 further comprising an intervening inert layer located between the first encapsulating coating and the second encapsulating coating, wherein the intervening inert layer provides a delay time between the first change and the second change; and wherein the composite particles have an average diameter of less than about 4 mm.

3. The composite particles of claim 2, wherein the delay time is about 0.5 to about 30 minutes.

4. The composite particle of claim 2, wherein the delay time is about 0.5 to about 3 minutes.

5. The composite particles of claim 1, wherein the first change in the optical and organoleptic properties is a first change in color and flavor and the second change in the optical and organoleptic properties is a second change in color and flavor.

6. The composite particles of claim 2, wherein the first change in the optical and organoleptic properties is a first change in color and flavor and the second change in the optical and organoleptic properties is a second change in color and flavor.

7. The composite particles of claim 3, wherein the first change in the optical and organoleptic properties is a first change in color and flavor and the second change in the optical and organoleptic properties is a second change in color and flavor.

8. The composite particles of claim 4, wherein the first change in the optical and organoleptic properties is a first change in color and flavor and the second change in the optical and organoleptic properties is a second change in color and flavor.

9. A powdered beverage mixture which provides a sequential change in optical and organoleptic properties when reconstituted in an aqueous solution, wherein the sequential change comprises at least (1) a first change in the optical and organoleptic properties and (2) a second change in the optical and organoleptic properties, said powdered beverage mixture comprising (a) a first powdered optical modifying agent comprising a colorant or glitter, and a first powdered organoleptic modifying agent and (b) composite particles having an inner layer containing a second optical modifying agent and a second organoleptic modifying agent, with an inert layer over the inner layer, wherein the second optical modifying agent is a colorant or glitter and wherein the composite particles are soluble in water; wherein, when the powdered beverage mixture is reconstituted with water, the first powdered optical modifying agent and the first powdered organoleptic modifying agent provide the first change in the optical and organoleptic properties, wherein the second optical modifying agent and the second organoleptic modifying agent from the inner layer of the composite particle provide the second change in the optical and organoleptic properties; and wherein the inert layer effectively provides a delay time of about 0.5 to about 30 minutes between the first change and the second change.

10. The powdered beverage mixture of claim 9, wherein the delay time between the first change and the second change is about 0.5 to about 3 minutes.

11. The powdered beverage mixture of claim 9, wherein the first change in the organoleptic properties is a first change in flavor and the second change in the organoleptic properties is a second change in flavor.

12. The powdered beverage mixture of claim 10, wherein the first change in the organoleptic properties is a first change in flavor and the second change in the organoleptic properties is a second change in flavor, and wherein the first and second organoleptic modifying agents are not sweeteners.

13. The powdered beverage mixture of claim 11, wherein the composite particles have an average diameter of less than about 4 mm.

14. The powdered beverage mixture of claim 12, wherein the composite particles have an average diameter of less than about 4 mm.

15. A method of providing a sequential change in optical and organoleptic properties in a food product when exposed to an aqueous solution, wherein the sequential change comprises at least (1) a first change in the optical and organoleptic properties and (2) a second change in the optical and organoleptic properties, said method comprising providing composite particles wherein the composite particles comprise a core particle having a first encapsulating coating formed thereon which contains a first optical modifying agent and a first organoleptic modifying agent, followed by a second encapsulating coating that surrounds the first encapsulating coating, the second encapsulating coating containing a second optical modifying agent and a second organoleptic modifying agent; wherein, when the composite particles are exposed to water, the second optical modifying agent and the second organoleptic modifying agent provides the first change in the optical and organoleptic properties, sequentially followed by the first optical modifying agent and the first organoleptic modifying agent providing the second change in the optical and organoleptic properties; and wherein the composite particles are soluble in water.

16. The method of claim 15, wherein the composite particles further comprise an intervening inert layer located between the first encapsulating coating and the second encapsulating coating, wherein the intervening inert layer provides a delay time between the first change and the second change; and wherein the composite particles have an average diameter of less than about 4 mm.

17. The method of claim 16, wherein the delay time is about 0.5 to about 30 minutes.

18. The method of claim 16, wherein the delay time is about 0.5 to about 3 minutes.

19. The method of claim 16, wherein the first change in the optical and organoleptic properties is a first change in color and flavor and the second change in the optical and organoleptic properties is a second change in color and flavor, and wherein the first and second optical modifying agents are colorants or glitters.

20. A method of providing a sequential change in optical and organoleptic properties in a reconstituted beverage prepared using a powdered beverage mixture, wherein the sequential change comprises at least (1) a first change in the optical and organoleptic properties and (2) a second change in the optical and organoleptic properties, said method comprising providing a powdered beverage mixture comprising (a) a first powdered optical modifying agent comprising a colorant or glitter and a first powdered organoleptic modifying agent and (b) composite particles having an inner layer containing a second optical modifying agent and a second organoleptic modifying agent and an inert layer over the inner layer, wherein the second optical modifying agent comprises a colorant or glitter, and wherein the composite particles are soluble in water; wherein, when the powdered beverage mixture is reconstituted with water, the first powdered optical modifying agent and the first powdered organoleptic modifying agent provide the first change in the optical and organoleptic properties, wherein the second optical modifying agent and the second organoleptic modifying agent from the inner layer of the composite particle provide the second change in the optical and organoleptic properties; and wherein the inert layer effectively provides a delay time of about 0.5 to about 30 minutes between the first change and the second change.

21. The method of claim 20, wherein the delay time between the first change and the second change is about 0.5 to about 3 minutes.

22. The method of claim 21, wherein the first change in the organoleptic properties is a first change in flavor and the second change in the organoleptic properties is a second change in flavor.

23. The method of claim 22, wherein the composite particles have an average diameter of less than about 4 mm.

* * * * *